(12) United States Patent
Merit et al.

(10) Patent No.: US 8,844,449 B2
(45) Date of Patent: Sep. 30, 2014

(54) TREE MOVER SYSTEM WITH AIRBAGS

(75) Inventors: Mark A. Merit, The Woodlands, TX (US); Thomas P. Cox, Spring, TX (US)

(73) Assignee: Environmental Tree and Design, Inc., Tomball, TX (US)

( * ) Notice: Subject to any disclaimer, the term of this patent is extended or adjusted under 35 U.S.C. 154(b) by 354 days.

(21) Appl. No.: 13/472,302

(22) Filed: May 15, 2012

(65) Prior Publication Data

US 2013/0305973 A1   Nov. 21, 2013

(51) Int. Cl.
*A01C 11/00* (2006.01)
*A01G 23/02* (2006.01)

(52) U.S. Cl.
USPC ............................................ 111/101; 414/23

(58) Field of Classification Search
CPC ...................................................... A01G 23/00
USPC ........... 111/101–103; 37/302; 414/23; 47/76; 171/1
See application file for complete search history.

(56) References Cited

U.S. PATENT DOCUMENTS

| | | | |
|---|---|---|---|
| 328,775 A * | 10/1885 | Hall ................................. | 414/23 |
| 783,241 A * | 2/1905 | Bisset .............................. | 414/23 |
| 2,714,011 A * | 7/1955 | Albee ............................... | 180/9 |
| 4,305,213 A | 12/1981 | Pelham | |
| 6,253,690 B1 | 7/2001 | Cox | |
| 6,530,333 B1 | 3/2003 | Cox | |
| 7,658,157 B2 | 2/2010 | Cox | |

OTHER PUBLICATIONS

International Searching Authority; International Search Report and the Written Opinion; Aug. 1, 2013.
Author: Qingdao Eversafe Marine Engineering, Co., Ltd, Catalog Title: Eversafe Heavy Lifting Airbags Date: No Date Total pp. 10 Country: Tianjin, China.

* cited by examiner

*Primary Examiner* — Alicia Torres
(74) *Attorney, Agent, or Firm* — Streets & Steele; Patrick K. Steele; Jeffrey L. Streets

(57) ABSTRACT

A large tree mover system includes a trench formed around the circumference of the tree, and a plurality of elongate supports beneath the root ball of the tree. Two or more connecting beams positioned over the plurality of supports connect the plurality of supports to form a substantially rigid frame. The plurality of inflatable airbags are positioned under the plurality of supports, and these or other airbags may be positioned under the supports to roll the root ball to a selected location. A method of moving large trees is also disclosed.

20 Claims, 4 Drawing Sheets

TREE MOVER SYSTEM WITH AIRBAGS

FIELD OF THE INVENTION

The present invention relates to techniques and equipment for moving live trees, and more particularly for moving trees with a trunk diameter of eight inches or more. The system of the present invention utilizes inflatable airbags to elevate the root ball and to roll the root ball over a ground surface.

BACKGROUND OF THE INVENTION

Numerous techniques have been used to move large trees. For trees with a diameter under eight inches, these trees are conventionally moved utilizing a powered spade with blades that drive downward and inward to capture the root ball, which is then lifted out of the hole and relocated to a new site. When moving large diameter trees, some movers use a "roundball" technique wherein pipes or boards are placed under the root ball of the tree, such the base of the round ball can then be lifted above the ground by a crane or similar device.

U.S. Pat. No. 4,305,213 illustrates an early version of a spade tree mover. U.S. Pat. Nos. 6,253,690, 6,530,333, and 7,658,157 disclose improvement in equipment for moving a large diameter tree.

The disadvantages of the prior art are overcome by the present invention, an improved tree mover system with airbags is hereinafter disclosed.

SUMMARY OF THE INVENTION

In one embodiment, a large tree moving system for moving a live tree having a root ball includes a plurality of generally parallel support members each positioned under the root ball for supporting the root ball. The plurality of support members have a lower surface which lies within a substantially horizontal plane, and the plurality of support members are substantially interconnected by a pair of beams each positioned over the plurality of support members and on opposite sides of the tree. A plurality of inflatable airbags each positioned under the support members are inflated to raise the support member and the root ball from the base of the hole. The root ball may then be rolled on a plurality of inflatable of airbags to a trailer for transport, or may be rolled to a new site adjacent the prior tree site.

These and further features and advantages of the present invention will become apparent from the following detailed description, wherein reference is made to the figures in the accompanying drawings.

DETAILED DESCRIPTION OF PREFERRED EMBODIMENTS

Figure 1:
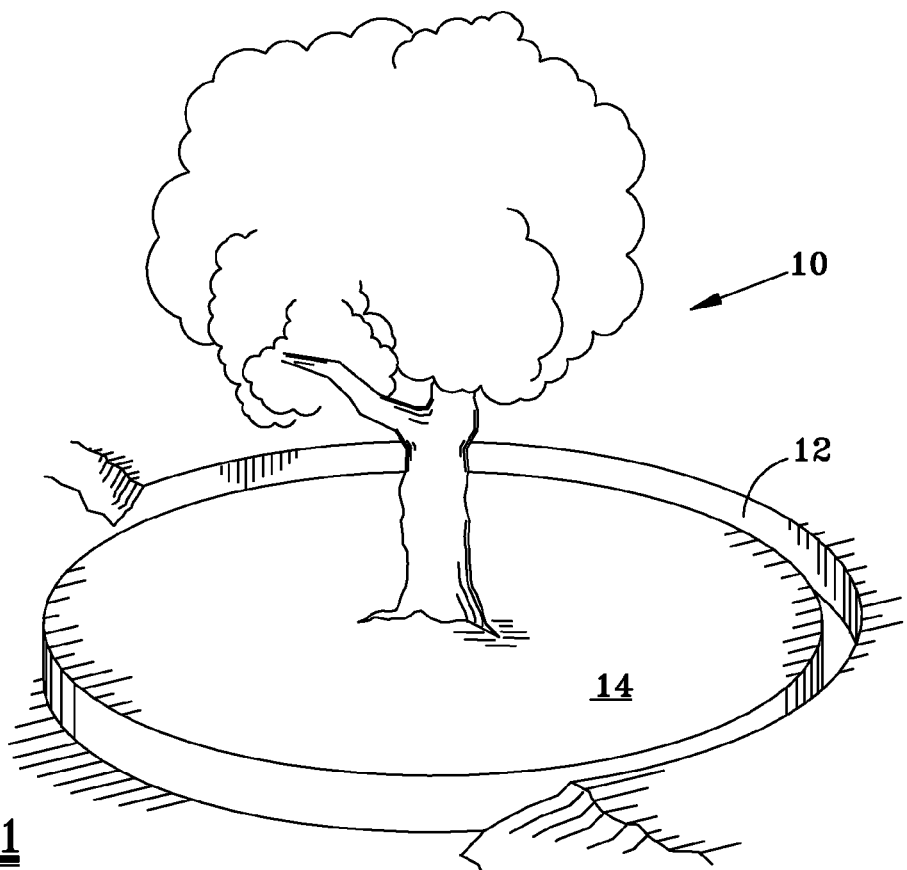
FIG. 1 illustrates a large diameter tree with a trench formed around a root ball, and the earth excavated such that the ground extends radially from the root ball slowly upward to ground level.
Figure 5:
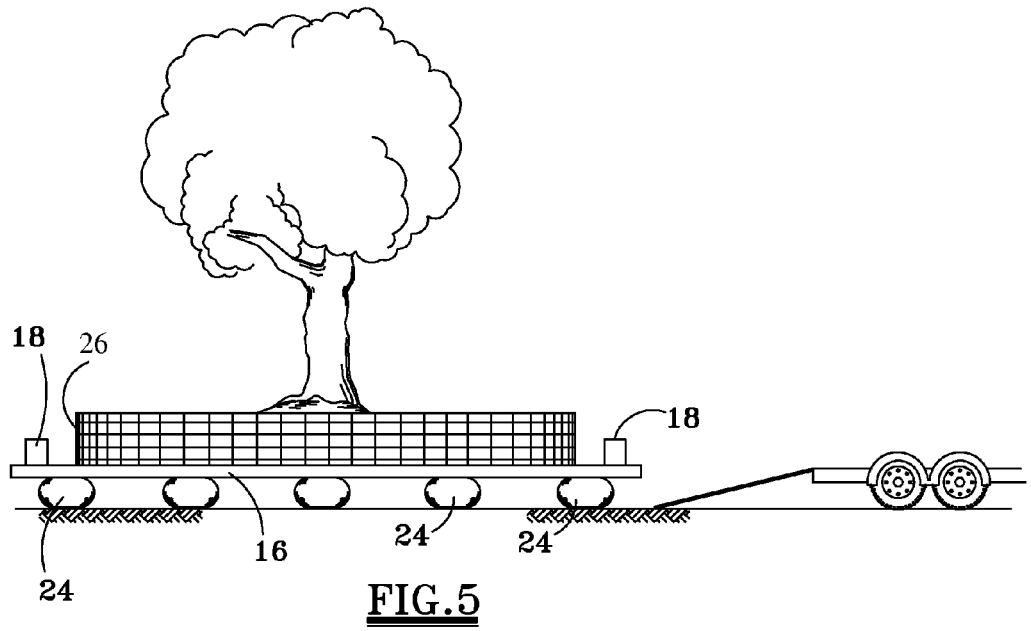
FIG. 5 illustrates the tree being rolled on a plurality of airbags to a trailer.

Referring to FIG. 1, the operation to move a large tree 10 may commence with manually digging a full perimeter trench 12 around the root ball of the tree at a radial distance compatible with the tree's future growth. Earth outward of the trench may then be excavated with a bulldozer or other powered equipment such that a slope extends outward from the bottom of the trench 12 to ground level. Approximately half of the earth outward of the trench is excavated in FIG. 1. At this stage or at a later stage, the perimeter of the root ball 14 may be wrapped with a cloth or wire mesh 26, as shown in FIG. 5. The root ball 14 normally has a depth of from 3 to 3½ feet for most soil conditions, and the root ball may weigh 250,000 pounds or more.

Figure 2:
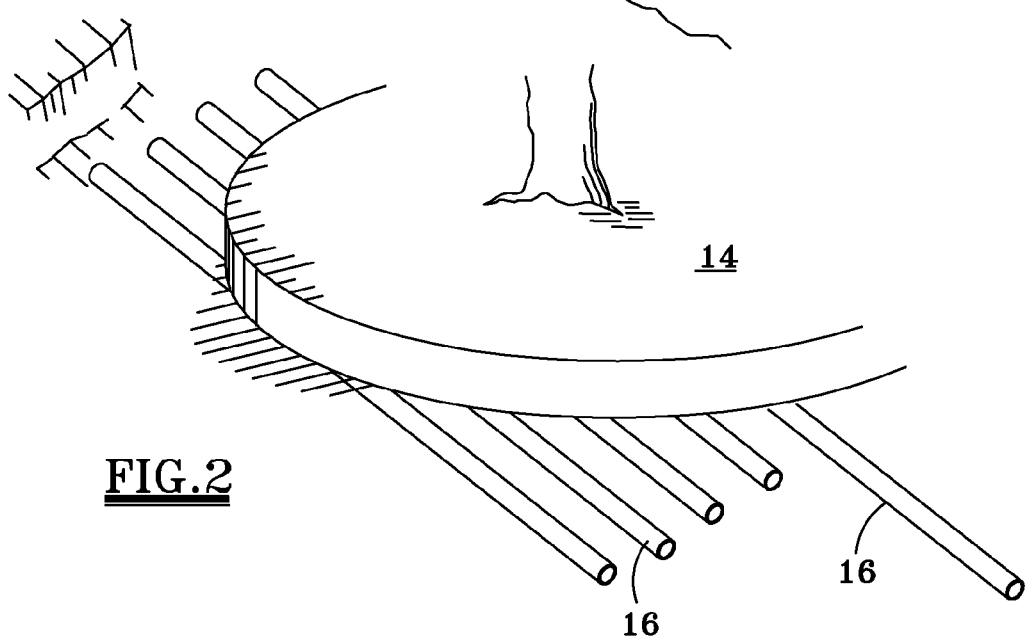
FIG. 2 illustrates a portion of the tree shown in FIG. 1 with a plurality of pipes positioned under the root ball.

Referring now to FIG. 2, a plurality of support members, such as elongate boards or pipes 16, may be inserted under the root ball, with the pipes 16 being generally parallel and extending from one side to an opposing side of the root ball. Those familiar with the "roundball" technique for capsulating a root ball will be aware of the technique shown in FIG. 2. Either manual or powered tools may be used for pushing the pipe 16 under the root ball. Each pipe 16 preferably extends from one side to an opposing side of the root ball, and extends beyond a perimeter of the root ball, as shown. A root ball may have a diameter of 20 feet or more, so that the pipes 16 may have a length of 30 feet or more.

Figure 3:
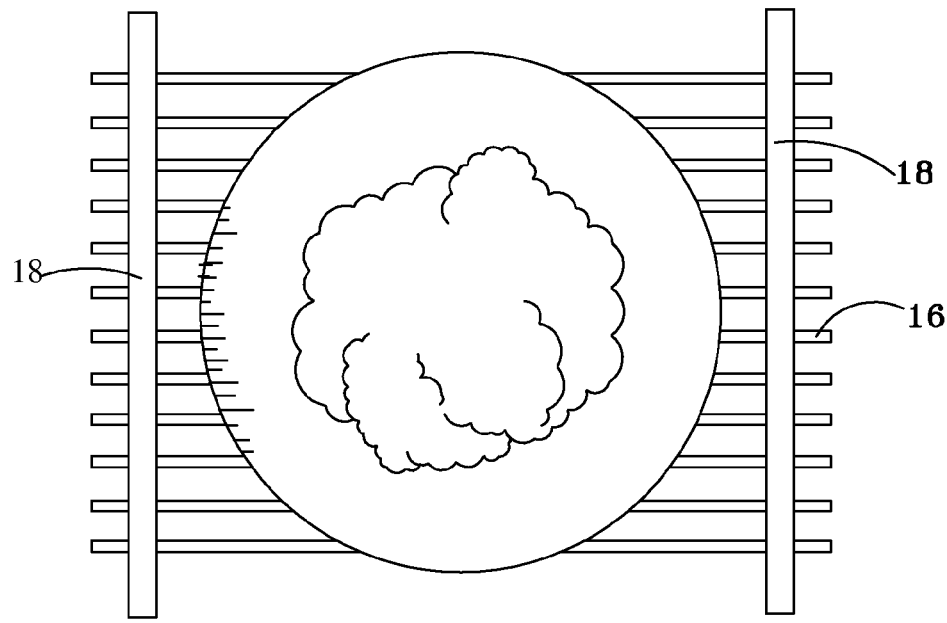
FIG. 3 is a top view of the tree shown in FIG. 1, with a complete set of pipes under the root ball and a pair of beams positioned on top of the pipes and interconnecting the pipes.

At this stage, the various elongate pipes or other tubulars may be secured together at each end by a beam 18, as shown in FIG. 3, which is positioned on top of the pipes 16, so that a lowermost surface of the pipes lie substantially within a common horizontal plane. The pipes 16 interconnected with the beams 18 form a substantially rigid frame.

Figure 4:
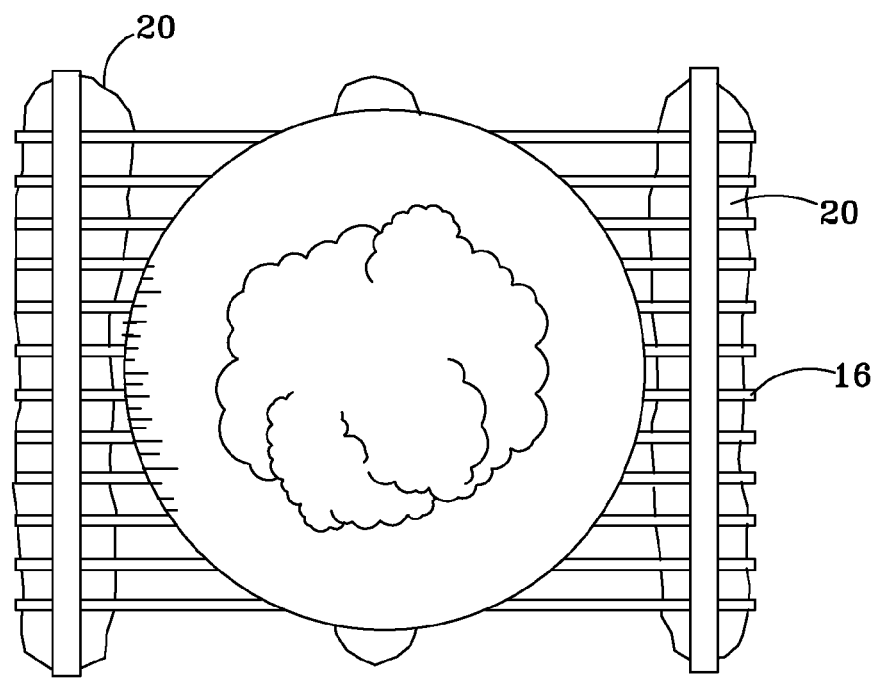
FIG. 4 illustrates a pair of trenches dug on opposing sides of the tree and under the plurality of pipes for installing airbags.

During the next operation, as shown in FIG. 4, a pair of relatively shallow trenches 20 may be dug under the pipes 16 and generally in the area below each of the beams 18. The trenches 20 may subsequently receive deflated airbags which, when inflated, will raise the pipes 16 and thus the root ball 14 above the level of the trenches. Two long airbags may each be placed under a respective beam and beneath the pipes, with each airbag in a respective trench and an elongate airbag axis generally parallel with a respective beam axis. Each airbag 24 as shown in FIG. 5 has an axial length when inflated which is substantially equal to the diameter of the root ball. The airbags inserted under the pipes while the root ball is in the hole may be inflated to raise the frame and the root ball. Additional airbags each having an axis substantially parallel to the original two airbags may be added, and the root ball and pipe frame then pushed or pulled up the graded slope on the side of the trench extending to ground level. If more than two airbags are required to lift the load, the pipes 16 as shown in FIG. 4 may be extended to the left and the right, so that additional trenches to the left and right of the trenches 20 shown in FIG. 4 may be added so that four air bags each in a respective trench may be used to lift the frame and the root ball.

FIG. 5 depicts a tree being moved on five airbags 24 for being positioned on a trailer 22 for transport to a new location. FIG. 5 depicts five airbags 24 for moving a tree. In other applications, ten or more airbags may be used for supporting the root ball, with the axes of the airbags each being generally parallel. Prior to the root ball being rolled off the most rearward airbag, a new inflated airbag may be added to the front of the pipe frame, so that a plurality of airbags continually support the frame and thus the root ball during movement. The elongate pipes 16 are thus generally parallel to the direction of travel of the root ball when supported on the airbags 24. The beam 18 and the centerline of the airbags are parallel to the direction of moving the root ball.

Figure 6:
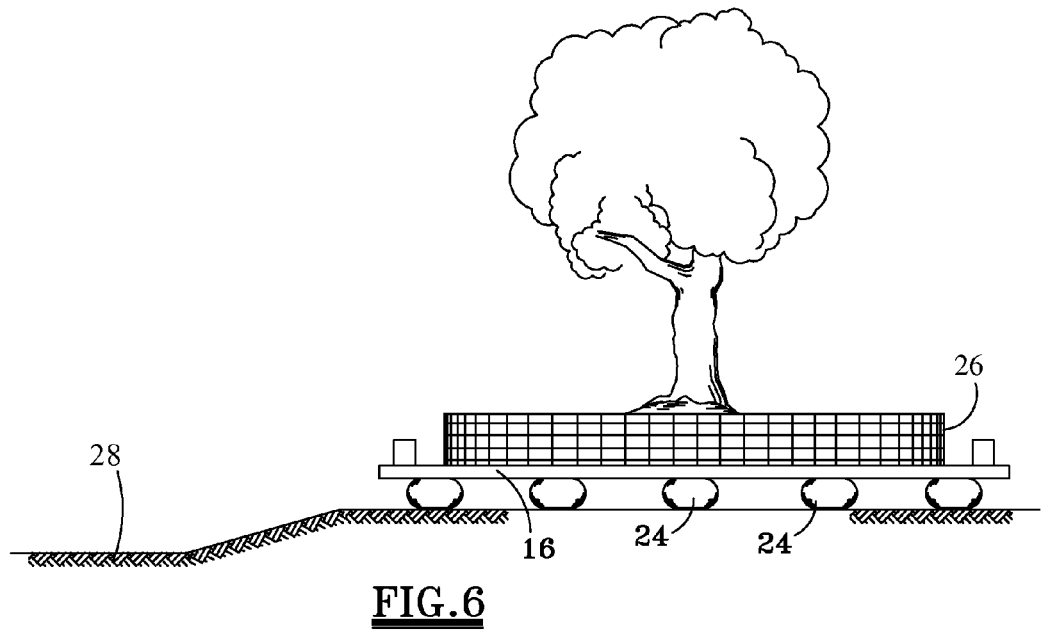
FIG. 6 illustrates a tree being moved on the airbags to a new site for planting.

FIG. 6 depicts the same root ball which may be pulled or pushed into a new hole 28 for planting the tree. The airbags may be deflated to lower the root ball onto small blocks, and the airbags then deflated and removed from beneath the pipes 16 prior to filling in the hole around the tree with soil. In some cases, the deflated airbags may be pulled from beneath the pipes. The pipes 16 and optionally the beams 18 may be buried under the root ball when the tree is at its new location. Alternatively, some or all of the pipes and the beams may be recovered before soil fills in the hole around the root ball. The airbags which elevate the root ball above the trench floor may be the same or different than the airbags used to roll the tree on the ground.

Figure 7:
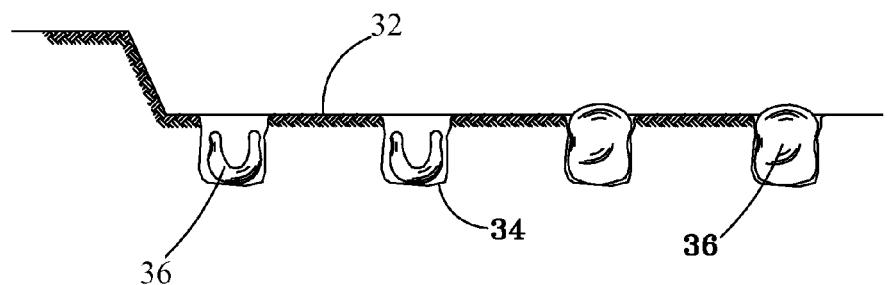
FIG. 7 illustrates a tree planting location including airbags in trenches.

FIG. 7 depicts a modified hole dug for receiving a tree at a new location. More specifically, the hole includes a substantially planar floor 32 and a plurality of trenches 34 each extending downward from the floor 32 and sized to receive a respective airbag 36. The left two airbags depicted in FIG. 7 are each in their deflated position, and each trench 34 receives a respective elongate airbag 36 therein. The airbags 36 in the right two trenches shown in FIG. 7 are partially inflated so that the top of the airbag is substantially at or slightly above the level of floor 32.

Figure 8:
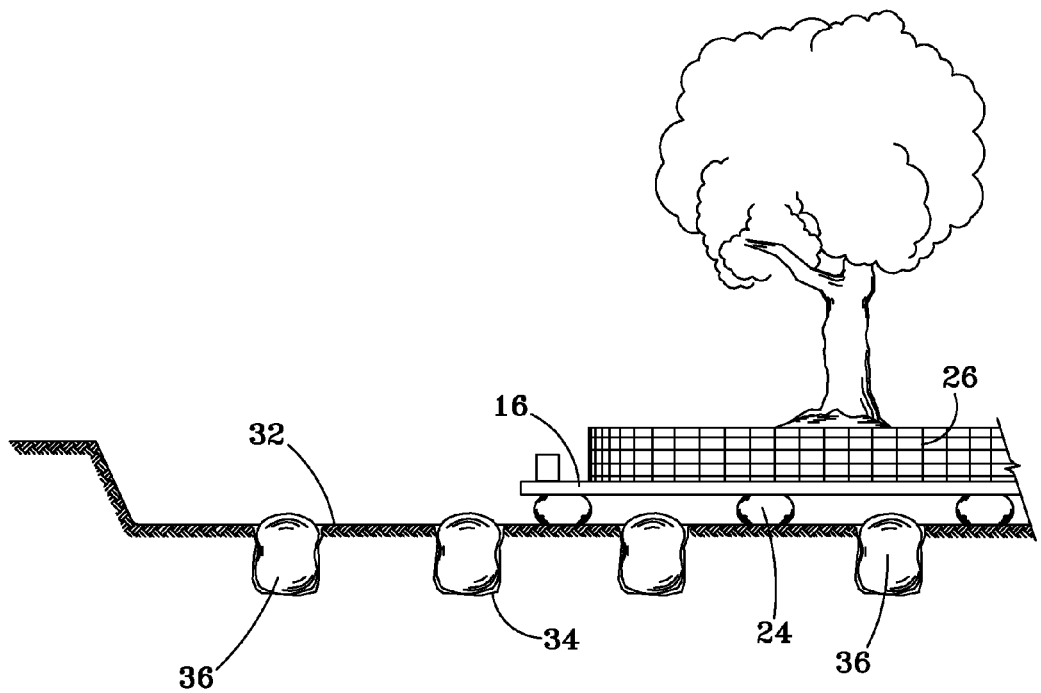
FIG. 8 illustrates a tree being positioned for planting at a new location.

With each of the stationary airbags 36 partially inflated, the root ball assembly as shown in FIG. 8 is supported on a plurality of movable airbags 24. Airbags 24 may thus roll over the tops of the partially inflated airbags 36. The stationary airbags 36 in the trenches 34 are preferably spaced between the movable airbags 24 when the tree is properly positioned in the hole. The stationary airbags 36 may then be fully inflated to rise above the floor 32 of the hole and at least partially support the weight of the root ball. At this stage, the movable airbags 24 may be deflated so that the pipes 16 rest on the airbags 36. The airbags 24 may then be fully deflated and removed from under the root ball. The stationary airbags 36 may then be deflated until the bottom of the root ball engages the floor 32. The airbags 36 may then be further deflated and removed from the trenches 34, which may then be back filled with soil pushed into the empty trenches. The stationary airbags 36 may be substantially similar to or may be different than the movable airbags 24.

The above techniques provide a surprisingly low cost system for moving large trees a relatively short distance, e.g. a half mile, and also provide a technique for moving a large tree to a trailer or other transport vehicle and loading or unloading the tree from the vehicle.

The lower surfaces of the pipes 16 provide a relatively smooth surface for engaging the airbags, and surprisingly low air pressure of 30 PSI or less reliably supports the root ball. The size of the trenches dug under the pipes and beneath the beams will depend upon the number and size of the airbags to lift the root ball. The trench can extend along substantially the length of the beams, as shown, or individual trenches may be formed each for receiving a respective airbag. Beams 18 may be generally perpendicular to the pipes 12, but could be angled and still serve their function of interconnecting the pipes.

The movable airbags 24 may be used to move the root ball from one location to another location. More particularly, the relatively low pressure of the airbags 24 (generally under 30 PSI) ensures that there is a large planar contact area between the surface of each airbag 24 and the pipes 16. More particularly, the pipes 16 as disclosed herein each reside a substantially horizontal plane. In practice, however, differences in the soil conditions and the action of pushing the pipes in place under the root ball results in some pipes being elevated with respect to other pipes. A particular feature of the airbags is that these bags reliably support the root ball even though the pipes are not within the same plane. More particularly, an airbag will deform around a lower portion of the lower pipe, and then will project upward in the space between pipes until the upwardly projecting airbag contacts and supports a portion of the root ball, so that the inflated airbag also supports and acts directly on a portion of the root ball to both help support the root ball and to minimize the likelihood of soil in the root ball falling between the pipes.

Although specific embodiments of the invention have been described herein in some detail, this has been done solely for the purposes of explaining the various aspects of the invention, and is not intended to limit the scope of the invention as defined in the claims which follow. Those skilled in the art will understand that the embodiment shown and described is exemplary, and various other substitutions, alterations and modifications, including but not limited to those design alternatives specifically discussed herein, may be made in the practice of the invention without departing from its scope.

What is claimed is:

1. A method of moving large trees, comprising:
    forming a trench around the circumference of the tree, the trench defining a perimeter of a root ball;
    inserting a plurality of elongate, substantially parallel supports under the root ball, each support extending between opposing sides of the root ball;
    positioning two or more connecting beams over the plurality of supports, each connecting beam connected to each of the plurality of supports to form a substantially rigid frame;
    inserting a plurality of inflatable bags under the plurality of supports;
    inflating the plurality of airbags to raise the plurality of supports and the root ball; and
    moving the root ball to a selected location using the plurality of inflated airbags to engage the plurality of supports and roll the root ball over the plurality of inflatable airbags.

2. The method as defined in claim 1, wherein each connecting beam is substantially perpendicular to each of the plurality of supports.

3. The method as defined in claim 1, wherein each of the elongate supports is generally parallel to the direction of travel when moving the root ball to the selected location.

4. The method as defined in claim 1, further comprising:
    creating a cavity on each side of the root ball and at least partially beneath the plurality of supports, each cavity receiving one or more inflatable airbag therein.

5. The method as defined in claim 1, wherein a centerline of each of the plurality of airbags is substantially perpendicular to the plurality of supports when moving the root ball; and
    additional airbags beneath the plurality of supports are used to move the root ball.

6. The method as defined in claim 1, further comprising:
    covering the perimeter of the root ball with one of a mesh or a fabric prior to moving the root ball.

7. The method as defined in claim 1, further comprising:
moving the root ball to a hole at the selected location;
maintaining the plurality of supports beneath the root ball when positioned in the hole; and
covering sides of the root ball with soil.

8. A method of moving large trees, comprising:
forming a trench around the circumference of the tree, the trench defining a perimeter of a root ball;
inserting a plurality of elongate, substantially parallel supports under the root ball, each support extending between opposing sides of the root ball;
positioning two or more connecting beams over the plurality of supports, each connecting beam connected to each of the plurality of supports to form a substantially rigid frame;
creating a cavity on each side of the root ball and at least partially beneath the plurality of supports, each cavity receiving one or more inflatable airbags therein;
inserting the one or more of inflatable airbags under the plurality of supports and in a respective trench;
inflating the one or more of airbags to raise the plurality of supports and the root ball; and
therefore moving the root ball to a selected location.

9. The method as defined in claim 8, wherein the root ball is moved using the plurality of inflatable airbags to engage the plurality of supports and roll the root ball over the plurality of inflatable airbags, wherein each of the elongate supports is generally parallel to the direction of travel when moving the root ball to the selected location.

10. The method as defined in claim 8, wherein each connecting beam is substantially perpendicular to each of the plurality of supports.

11. The method as defined in claim 8, wherein a centerline of each of the plurality of airbags is substantially perpendicular to the plurality of supports when moving the root ball.

12. The method as defined in claim 8, further comprising:
moving the root ball into a hole at the selected location;
maintaining the plurality of supports beneath the root ball when positioned in the hole; and
covering sides of the root ball with soil.

13. A system for moving large trees, including a trench around the circumference of the tree, the trench defining a perimeter of a root ball, the system comprising:
a plurality of elongate, substantially parallel supports under the root ball, each support extending between opposing sides of the root ball;
two or more connecting beams posititioned over the plurality of supports, each connecting beam connected to each of the plurality of supports to form a substantially rigid frame;
a plurality of inflatable airbags positioned under the plurality of supports; and
the plurality of inflatable airbags engaging the plurality of supports to roll the root ball over the plurality of inflatable airbags to a selected location.

14. The system as defined in claim 13, wherein each connecting beam is substantially perpendicular to each of the plurality of supports.

15. The system as defined in claim 13, further comprising:
a cavity on each side of the root ball and at least partially beneath the plurality of supports, each cavity receiving an inflatable airbag therein.

16. The system as defined in claim 13, further comprising:
one of a mesh or fabric covering the perimeter of the root ball.

17. A method of moving large trees, comprising:
positioning a plurality of elongate, substantially parallel supports under a root ball, each support extending between opposing sides of the root ball and generally parallel to the direction of travel when moving the root ball to a selected location;
positioning two or more connecting beams over the plurality of supports, each connecting beam connected to each of the plurality of supports to form a substantially rigid frame;
providing a plurality of movable inflatable bags under the plurality of supports to support the root ball; and
moving the root ball to the selected location using the plurality of movable inflatable airbags to engage the plurality of supports and roll the root ball over the plurality of inflatable airbags.

18. The method as defined in claim 17, further comprising:
providing a hole at the selected location with a plurality of trenches below a hole floor;
partially inflating a stationary airbag within each of the plurality of trenches;
moving the root ball into the hole at the selected location and over the plurality of partially inflated stationary airbags;
thereafter inflating the plurality of stationary airbags to at least partially support the root ball;
thereafter deflating a plurality of movable airbags such that the root ball is supported on the plurality of stationary airbags;
removing the deflated movable airbags from beneath the root ball; and
covering the sides of the root ball with soil.

19. The method as defined in claim 18, further comprising:
further deflating the plurality of stationary airbags until the root ball is supported on the hole floor.

20. The method as defined in claim 19, further comprising:
removing the stationary airbags from beneath the root ball after deflating the stationary airbags.

* * * * *